United States Patent
Aurenge et al.

[15] 3,693,661
[45] Sept. 26, 1972

[54] MULTIPLE FLOWPATH ROTARY VALVE

[72] Inventors: Jacques Aurenge, 74, Avenue du Fort St. Irenee, 69 Lyon 5eme; Jean Desfeuillet, Route du Pont, 69 Jons, both of France

[22] Filed: Aug. 7, 1970

[21] Appl. No.: 62,080

[30] Foreign Application Priority Data

Aug. 12, 1969 France......................6927636

[52] U.S. Cl...............................137/625.18, 251/180
[51] Int. Cl........................F16k 5/14, F16k 11/00
[58] Field of Search .137/625.18; 251/180, 192, 174, 251/176

[56] References Cited

UNITED STATES PATENTS

| | | | |
|---|---|---|---|
| 3,131,706 | 5/1964 | Harban | 137/625.18 X |
| 3,570,536 | 3/1971 | Walker et al. | 251/180 |
| 3,186,434 | 6/1965 | Hrdina | 251/180 X |
| 3,550,627 | 12/1970 | Alexander | 251/180 X |

*Primary Examiner*—William R. Cline
*Attorney*—Browdy and Neimark

[57] ABSTRACT

A multi-way valve capable of use at high pressures including a pair of coaxial cylindrical facing bodies, one rotatable and the other stationary, having passageways therethrough, a seal therebetween, an axle and a spring urging the bodies together.

5 Claims, 3 Drawing Figures

INVENTORS
Jacques Aurenge &
Jean Desfeuillet

BY Browdy and Neimark

ATTORNEYS

MULTIPLE FLOWPATH ROTARY VALVE

The present invention relates to a new type of multiple-way valve, permitting various fluids under relatively high pressures to be introduced to devices or removed successively therefrom, and, more particularly, to the introduction of gaseous or liquid samples into analysis apparatus, such as for example chromatography columns to achieve analysis in a continuous way.

There are already known in the art several multiple-way valves which allow the transfer of gaseous or liquid fluids from one or several feeding sources to other devices having to receive one or several samples. Use application possibilities offered by these various types of valves depend, of course, upon their design.

Among these known multiple-way valves, a first group is constituted of valves said to be "with drawers" which may have the form of a cylinder composed of two sleeves, the male part of which, sliding by translation, is provided with annular grooves which provide communication with various feeding and flowing tubes. In this case, the number of passages is very quickly limited by drawer run which cannot be over-dimensioned. According to another group of multiple-way valves, the external jacket of which may have a cruciform aspect, the male element or dome, having a cylindrical, trunconical or spherical form, is pierced with channels in L-, T- or X-form; the elements connect together by rotation in two ways of the female element to ensure fluid flow from one place to another. If this type of valve has the advantage of easy design and handling, it has the disadvantage of being limited in the number of passageways. Other valve types are known but their design is such that the passageway number is low, taking in account the valve volume.

A new type of valve has now been developed, the number of passageways of which is not limited and which, combining several already known and unknown features, obviates the precited disadvantages and may be easily used for introducing to devices or taking therefrom various liquid or gaseous fluids.

The multiple-way valve according to an embodiment of the invention consists of:

two cylindrical coaxial bodies, the one being fixed and the other one movable, having internal passages bent at right angles each having a terminal aperture which is on the lateral surfaces of said bodies and another aperture on their facing bases;

a seal of polymer material, inert with regard to the various chemical agents contemplated to be used, and placed between the two facing bases of the cylindrical bodies, a driving shaft for the movable body and independent of the fixed body, and moved by an electrical motor, a compression system urging the two cylindrical bodies together and squeezing the inserted seal in order to ensure tightness and placed on the side of the movable body.

The first or fixed body is in the form of a cylinder having an axial opening and provided on its upper face with a coaxial cylindrical cup. The fixed body has internal connecting passageways bent at right angles, which passageways may be provided in pairs, the passageways forming a pair being in the same axial plane whereas different pairs, considered in a plane perpendicular to the axial one, are displaced at an angle alpha. Angle alpha is inversely proportional to valve diameter and may be comprised, for example, between 20° and 45° for a maximal number of pairs in the case of a valve having a diameter of 40 mm.

The second or moving body is also in the form of a cylinder of the same height and same diameter as the fixed body, having an axial opening. It is also provided with passageways bent at right angles and possibly situated in pairs displaced at the same angle alpha. Passageway ends are situated, at one end, on the cylindrical surface of the body and, at the other end, on its upper face and on the axis of the fixed body openings. Moreover, the moving body is provided on its lower face with a coaxial cylindrical cup while its axial opening has a housing intended to receive a joint-key.

A scaling seal is placed between the two bodies and is fixed to the fixed body. Generally made of a material inert with regard to carried reagents, this seal presents itself in the form of a thick disk having a diameter identical to that of the moving and fixed bodies, axially open and also provided through its thickness with openings ensuring fluid passing from one body to the another. The seal must resist to a great degree pressure without undergoing any deformation or bursting resulting from flow phenomenon.

A driving shaft for the valve moving body, which plays the part of axis for the whole of the elements constituting the valve, has a fundamental part in the mounting and driving of those various elements. This cylindrical shaft which passes through the axial openings of the bodies and seal is provided with threading at one of its ends and at the other end has a cylindrical flange provided with a ball-thrust against which are supported the cylindrical fixed body, tightness seal and moving cylindrical body. This shaft is also provided with a housing for a key, which allows for the mechanical connection of the shaft with moving cylindrical body. The ball-thrust is important in reducing friction, allowing a stronger spring compression, and in obtaining high pressures with a small driving couple.

A compression system ensures tightness between the fixed and moving bodies of the valve, by enclosing the seal of inert material between the two constitutive body blocks. Compression is obtained by the action a series of pieces including a helicoidal spring, one end of which enters the moving body cup and the other end of which enters a cheek plate maintained in place by a nut and a lock-nut, mounted on the shaft threading. These pieces ensure the intensity of applied pressure and system blocking.

Rotation movement of the moving cylindrical body is ensured by an electrical motor, connected with the driving shaft. Fluid feeding and flowing within the valve are achieved by means of inlet and outlet tubes situated respectively on the cylindrical surface of moving and fixed bodies.

The invention will be better understood by the following detailed description of an embodiment taken in conjunction with the drawing wherein.

Figure 1:
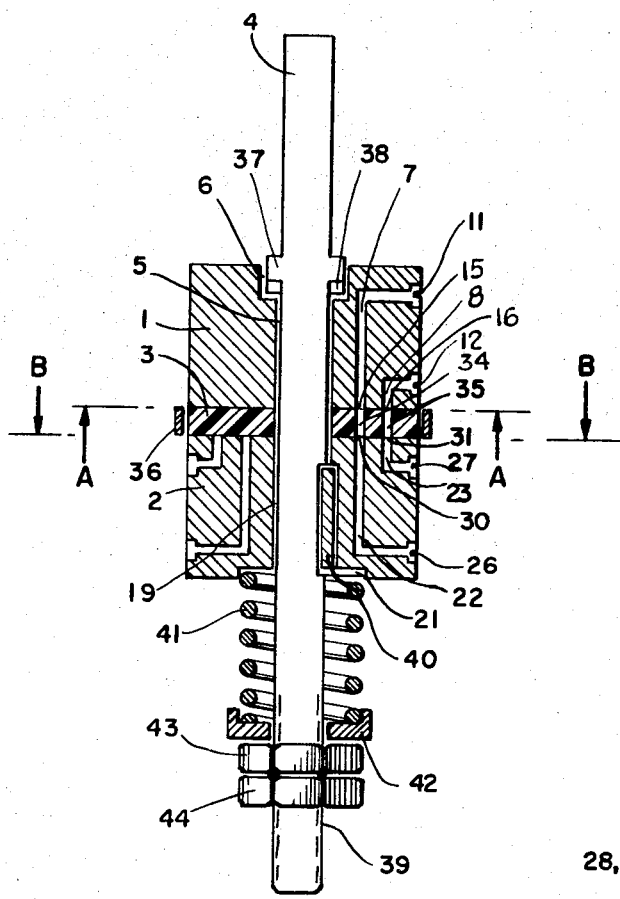
FIG. 1 represents a vertical section schematizing the parts characterizing the multiple-way valve.
Figure 2:
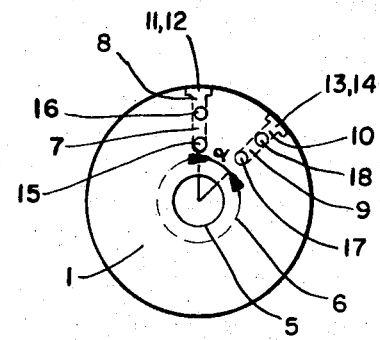
FIG. 2 illustrates a horizontal section along line A—A of FIG. 1 and shows the fixed cylindrical body.

The valve is constituted of a fixed cylindrical body 1 fixedly connected to a frame (not shown), a cylindrical moving body 2, a seal 3 of an inert material interdependent with cylindrical body 1 and situated between the two bodies, and a driving shaft 4 passing through bodies 1 and 2 and seal 3.

The cylindrical body 1, pierced through its axis with a hole 5 bored at a diameter such that shaft 4 may turn freely and without any rubbing in its inside, is provided on its upper face with a cylindrical cup 6. The body 1 has internal connecting passageways 7 and 8, and 9 and 10 bent at right angles, said pairs being displaced from one another at angle alpha. Inlets 11–12 and 13–14 are situated on the cylindrical body periphery while outlets 15–16 and 17–18 open on the lower face of the body 1.

Figure 3:
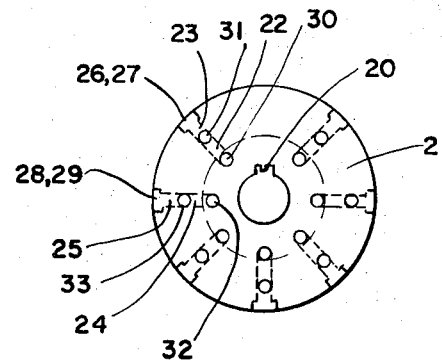
FIG. 3 represents a horizontal section along line B—B of FIG. 1 showing the moving cylindrical body.

Movable cylindrical body 2, pierced through its axis with a hole 19 of a diameter very slightly greater than that of shaft 4, which hole has on a part of its height a groove 20 intended for receiving a joint-key, is provided on its lower face with a cylindrical cup 21. Cylindrical body 2 has also internal connecting passageways bent at right angles 22–23 and 24–25, displaced from one another at the same precited angle alpha. Inlets 26–27 and 28–29 are situated on the periphery of the body 2 while outlets 30–31 and 32–33 open on the upper face in the axis of openings 15–16 or 17–18. According to FIG. 3, cylindrical body 2 may have at least a pair of passageways and as many as seven pairs, every pair being displaced, in this case, at an angle alpha with regard to the pair preceding it; left free from openings is a sector of the upper face, the angle of which is at least equal to 2 alpha.

Between the two cylindrical bodies 1 and 2 is placed a tightness seal 3 of the same diameter, hollowed at its axis and attached to the cylindrical body 1 by any convenient fixing means. This seal is provided through its thickness with a number of openings equal to the number of passageways of cylindrical body 1, and having an identical diameter and being aligned therewith. FIG. 1 illustrates two of those opening 34 and 35 which ensure that fluid flows in passageways 7–22 and 8–23. The seal 3, submitted to relatively high pressures, is reinforced by a collar 36 which prevents its flow. In a variant (not shown) collar 36 is fixed to cylindrical body 1 and has the same external diameter; in this case seal 3 of inert material is partly embedded in a cup constituted by this form. The contacting faces of the fixed and moving cylindrical bodies and of the joint seal are very finely polished to provide a mirror finish.

Shaft 4 is made in such a way that it has at one of its ends a flange 37, provided with a ball-thrust 38 for fitting in cup 6 of cylindrical body 1. The other end of shaft 4 is provided with a screw-thread 39. Between the thread 39 and flange 37 there is a groove allowing the assembling of the shaft 4 with the cylindrical body 2 by the intermediary of a key 40.

The assembly between cylindrical bodies 1 and 2 and the inserted seal 3 is made tight owing to a compression device comprising a helicoidal spring 41 embedded in the cup 21 of body 2, a cheek plate 42 maintained in its position by means of a nut 43, and a lock-nut 44.

Dimensions of multiple-way valves according to the invention may vary between large limits. Especially, an increase of the valve diameter permits an increase in the number of passage-ways: so, in doubling valve dimensions, it is possible to obtain a moving cylindrical body having at least one pair of passageways and as many as 15 pairs of passageways.

Materials constituting the various parts of multiple-way valves according to the invention may be of various natures. So, for example, it is possible to use metals or metal alloys resistant to corrosion or machinable or molded plastic materials for the fixed and moving cylindrical bodies; polymers having a good mechanical resistance and inert with regard to chemical agents, for example "Teflon," for the tightness seal; and simple or stainless steels for the valve shaft.

Multiple-way valves according to the invention are especially convenient to use in numerous fields. Applications, depending upon the association of number of passageways in the moving cylindrical body and fixed cylindrical body, are multiple and the examples quoted, in an illustrative way, have no limitative character for the object of the invention.

According to one application type it is possible to take samples of a gaseous or liquid fluid, during a reaction, a separation, in view of a control analysis, etc. So, with a valve of 16 ways, the fixed cylindrical body of which has four ways and the moving body 12 ways forming three groups of four ways, it is possible to achieve the simultaneous taking of four samples, at the various levels of a device, then by rotation of the moving body to repeat this taking at moments determined in advance.

Other application fields consist in fluid transfer from one or several reaction or storage enclosures to other enclosures, in the introduction of various gaseous or liquid fluids within a reactor and at various levels, etc. In all those cases, the disposition and the number of ways in fixed and moving cylindrical bodies of the valve depends upon the complexity of the contemplated problem.

Another type of use has shown to be especially advantageous in devices for continuous analysis, for example in the chromatography field. There, the moving part of the multiple-way valve according to the invention is provided with receptacles which comprises metal tubings or tubings of polymer material inert with regard to the various chemical agents that they must contain, spiral-wound, and the ends of which are fixed in a tight way on apertures 26–27, 28–29, etc. So, when moving cylindrical body 2 has 14 ways, associated by pairs in radial planes, it is provided with seven receptacles being able to receive the same number of samples.

Then in this contemplated usage, the multiple-way valve may be associated with another valve of known type and the device constituted in this way is connected, on one hand, to a source of a carrier fluid and, on the other hand, to a chromatographic column.

The various samples to be analyzed are first introduced into receptacles. For this purpose openings 30 and 31 of the moving cylindrical body, corresponding to the first receptacle, are placed in front of openings 17 and 18 of the fixed cylindrical body. The first sample to be analyzed is introduced through opening 13 of fixed cylindrical body 1, follows passageway 9, goes out opening 17, enters into moving cylindrical body 2 through opening 30, follows passageway 22, then is introduced into the receptacle in loop form through the aperture 26. The excess of sample goes out opening 27, follows passage 23, escapes from movable cylindrical body 2 by opening 31, enters fixed cylindrical body 1 by opening 18, follows passage 10 and is removed through mouth 14. Then the moving part 2 of the valve according to the invention is submitted to a rotation of angle alpha which brings openings 32 and 33, leading to another receptacle, in the front of openings 17 and 18. So the filling of every receptacle is made step by step.

The injection of every sample to be analyzed in the chromatographic column is achieved according to a precise and possibly programmed operative cycle.

Openings 30 and 31 of the movable cylindrical body 2 are placed in front of openings 15 and 16 of the fixed cylindrical body 1. Carrier fluid is introduced through opening 11 into the cylindrical body 1, follows passage 7 from which it goes out opening 15, enters the movable cylindrical body through opening 30, follows passage 22 and enters the receptacle containing the first sample through opening 26. Then the sample is carried away by carrier fluid across passage 23, passes from cylindrical body 2 into cylindrical body 1, using openings 31 and 16, follows passage 8, goes out from multiple-way valve through opening 12 and then is injected into the chromatographic column, using the second associated valve. The first sample being analyzed, moving cylindrical body 2 undergoes a rotation of angle alpha which brings the second sample in injection position. The operative cycle repeats in this way step by step.

For this especially advantageous application, there has now been developed and experienced in the field of liquid phase chromatography, a multiple-way valve which has a diameter of 40 mm, the fixed and moving cylindrical bodies have heights of 25 mm each and the seal, made of "Teflon," has a thickness of 5 mm, while the passageway diameters are 1.5 mm. The fixed cylindrical body 2 is provided with two pairs of tubes the radial planes of which are displaced at an angle alpha equal to 45°, while the moving cylindrical body 1 has 7 pairs of tubes the radial planes of which are displaced at the same angle, thus reserving a sector free of openings the angle of which is 90°. This valve has undergone, during several cycles of chromatographic analyses, pressures of about 40 bars and it has been possible to note the complete tightness of the whole valve and the absence of any seal deformation. The driving couple for the valve was in this case lower than or equal to 25 kg/cm. Greater pressures may be reached increasing the value of this couple.

It will be obvious to those skilled in the art that various changes may be made without departing from the scope of the invention and the invention is not to be considered limited to what is shown in the drawings and described in the specification.

What is claimed is:

1. A multiple-way valve operable under pressures up to 40 bars, comprising
   a. a shaft;
   b. a first cylindrical body coaxial with and fixedly connected to said shaft, said first body having at least one pair of internal passageways, the passageways forming a pair being situated in the same axial plane on the same side of said shaft;
   c. a second cylindrical body connected rotatably and coaxially with said shaft such that it may remain in a fixed longitudinal position in relation to said shaft and said first body and located adjacent said first body at one axial end thereof, said second body having at least two pairs of internal passageways, the passageways forming a pair being situated in the same axial plane on the same side of said shaft;
   d. a seal connected to said first cylindrical body and located between said first and said second bodies, said seal having internal passageways therethrough connecting with each passageway of said first body; and
   e. compression means connected to said shaft for urging said first and second cylindrical bodies into tightness toward each other and said seal;
   wherein each of said internal passageways in said first and second cylindrical bodies have one terminal aperture being situated on the lateral surface of said body and another aperture being situated on the base of said body facing said seal.

2. A multiple-way valve in accordance with claim 1, wherein passageways forming a pair in each of said cylindrical bodies are displaced from the nearest other passageways forming a pair, considered in a plane perpendicular with said shaft, by a predetermined constant angle.

3. A multiple way valve in accordance with claim 1 wherein said shaft has, at its end adjacent said second cylindrical body, a cylindrical flange supported on a ball-thrust placed on said second cylindrical body.

4. A multiple-way valve in accordance with claim 1 wherein the movable and fixed cylindrical bodies are formed of metal materials, alloys or plastic materials and said seal is formed in an inert slippery, deformation resistant sealing material.

5. A multiple way valve in accordance with claim 4, further including a peripheral ring attached around the periphery of said seal for preventing flow of said seal material.

* * * * *

UNITED STATES PATENT OFFICE
CERTIFICATE OF CORRECTION

Patent No. 3,693,661　　　　　　Dated September 26, 1972

Inventor(s) Jacques AURENGE et al.

It is certified that error appears in the above-identified patent and that said Letters Patent are hereby corrected as shown below:

IN THE TITLE, delete "FLOWPATH" and insert --FLOW PATH--; (both on cover page and line 1 of column 1)

Col. 1, line 12, delete "Use";
　　　　line 13, delete "application" and insert --Application--

Col. 3, line 49, delete "joint";

Claim 4, line 4, change "in" to --of--.

Signed and sealed this 22nd day of May 1973.

(SEAL)
Attest:

EDWARD M. FLETCHER, JR.　　　　　ROBERT GOTTSCHALK
Attesting Officer　　　　　　　　Commissioner of Patents